Nov. 8, 1960   F. HAGEMANN   2,959,258
DEVICE FOR THE RAPID ATTACHMENT AND RELEASE OF
ROLLER CAGES, TOOTHED ROLLERS OR
MACHINES MOUNTED ON SOLE-PLATES
Filed June 26, 1958
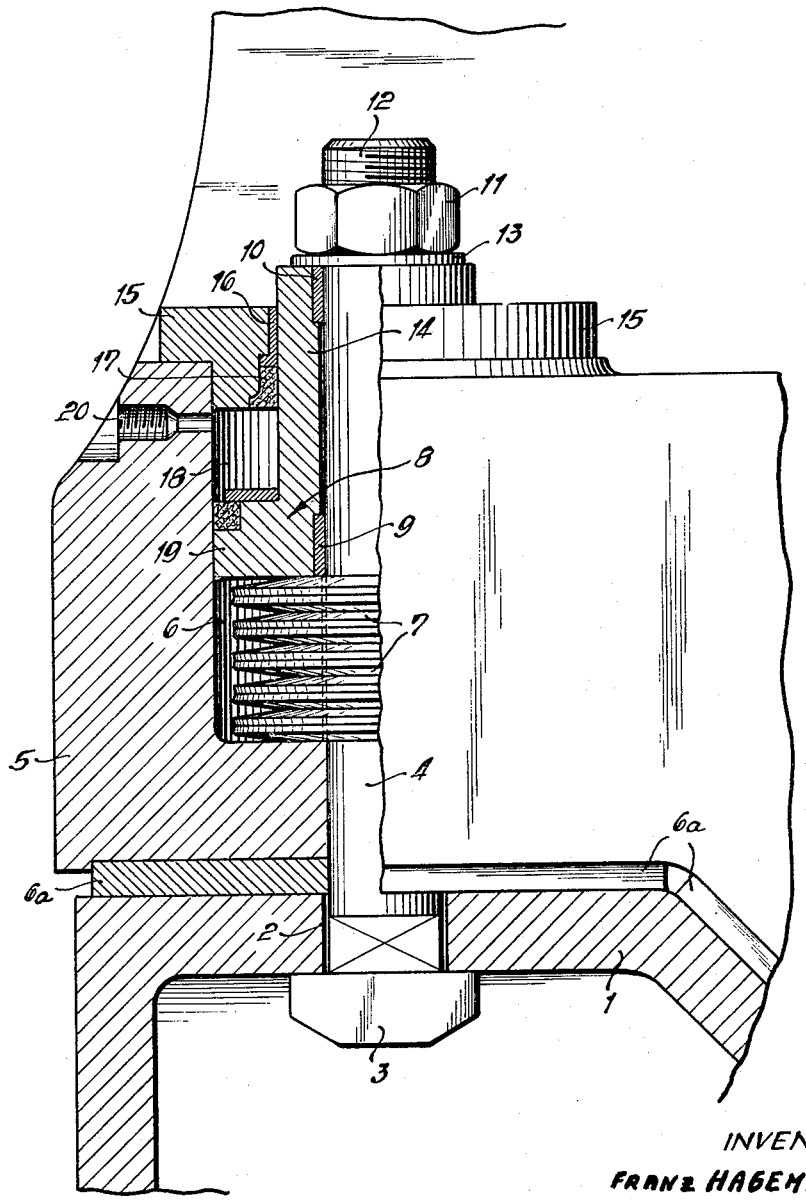
INVENTOR
FRANZ HAGEMAN
By: Malcolm W. Fraser
ATTORNEY United States Patent Office 2,959,258
Patented Nov. 8, 1960

2,959,258

DEVICE FOR THE RAPID ATTACHMENT AND RELEASE OF ROLLER CAGES, TOOTHED ROLLERS OR MACHINES MOUNTED ON SOLE-PLATES

Franz Hagemann, Osnabrucker Strasse, Holzhausen, Westphalia, Germany

Filed June 26, 1958, Ser. No. 744,740

Claims priority, application Germany June 27, 1957

2 Claims. (Cl. 189—36)

The invention relates to the rapid attachment and release of roller cages, toothed cages or like machines mounted on sole-plates, having an anchor which connects the machine or the like to the sole-plate, hydraulic pressure being used.

Known means of connection using hammer-head screws or wedges are today used almost exclusively only for attaching stationary cages, while constructions intended to facilitate rapid release and tightening of connections are used for attaching exchangeable cages or machines. In recent times (Steel and Iron, February 1954 issue) attachments have become known wherein a retaining clamp is mounted on the standard via suitable extensions which are fixed with a wedging action by means of a tension or compression anchor, a clamping nut etc., or by hydraulic means.

The use of tension or compression anchors and clamping nuts leads to constructional difficulties by hindering support of the rollers etc., while pressure must be continuously maintained in the hydraulic cylinder if the clamps are to be pressed on hydraulically. In addition, known devices require a large quantity of material, and are not trouble-free.

The invention provides an attachment process in which the disadvantages of earlier attachments are avoided in principle, and it is also possible accurately to adjust the clamping forces as desired.

The process according to the invention is characterised in that an element connected to the attachment anchor is subjected to hydraulic pressure against the action of resilient elements, the connection between the anchor and this element is adjusted to the desired clamping force and the hydraulic pressure is then released.

With this arrangement, the anchor may be adjusted to the desired clamping force without the expenditure of a large amount of force, but the continuous maintenance of hydraulic pressure may be avoided in principle.

In a device for carrying out the process according to the invention, it is expedient to use a piston-like element which is capable of being connected to the anchor and may be displaced in a bore in the machine or the like or in the sole-plate against the action of resilient elements, and a closure cover for the bore which communicates with a source of pressure means.

The anchor may then take the form of a pin which may be screwed into the piston-like element, or the piston-like element is so designed as to have a piston-rod-like extension passing through the cover, and receiving in a central bore the anchor which takes the form of a hammer-head screw or the like. If desired, this anchor is then fixed above the piston-like element by means of a nut or wedge, the action of the resilient elements being temporarily removed by the hydraulic pressure, so that the clamping force of the anchor at its nut or wedge connection may be adjusted to any desired value.

The resilient elements preferably take the form of plate springs in order to achieve the required considerable clamping forces.

The drawing shows an example of embodiment of the subject of the invention.

Numeral 1 designates the sole-plate, having a slot at 2, through which is passed the flattened anchor head 3 of the anchor 4, the anchor head thereupon being rotated through 90°, and thus secured against withdrawal from the slot 2. Numeral 5 designates by way of example a roller cage which is intended to be attached to the sole-plate 1 via the slide strip 6a. In the example shown, the part 5 is provided with a bore 6 which receives the centrally pierced plate springs 7 fitted over the shank of the anchor 4. A piston-like element 8, which is passed over the shank of the anchor 4 via guides 9, 10, rests on the plate springs 7. In the example of embodiment illustrated, connection between the piston-like element 8 and the anchor 4 is provided by a nut 11, which is screwed on to the threaded end 12 of the anchor above a washer 13. In the example of embodiment illustrated, the piston-like element 8 has a piston portion 19 and a piston-rod portion 14. The piston-rod portion 14 passes through a bore in a cover 15, the said bore being sealed by guides 16 and packings 17. Pressure means is fed via the union 20 to the space 18 which is left between the cover 15 and the piston portion 19 of the element 8. Feed may be effected with the aid of an intrinsically known cheap pressure means pump, which is not shown and may be driven by a motor or manually.

To adjust the clamping forces, the space 18 is subjected to pressure by feeding in pressure means, so that the piston-like element 8 is forced downwards in the drawing against the action of the spring 7. The nut 11 may now be tightened to the easily calculated value of clamping force required, whereupon the pressure means is allowed to flow away again, and the anchor supplies the desired clamping effect under the action of the plate spring 7.

I claim:

1. A device for expediting the attachment and release of a part to a mounting plate comprising an anchor bolt extending through said part and said mounting plate for securing the two together, an adjusting nut on the end of said bolt through said part, a blind bore in the surface of said part remote from said mounting plate and concentric about said bolt, a closure for the open end of said bore about said bolt, a piston reciprocable within said bore about said bolt, a spring device about said bolt between one end of said piston and the base of said bore, a sleeve extension on the opposite end of said piston terminating in the region of said nut so that the latter can be adjusted to exert pressure against the end of said sleeve extension, space being provided in said bore above said piston and below said end closure, and means for admitting fluid under pressure into said space thereby to actuate said piston to compress said spring device to facilitate manipulation of the nut.

2. A device as claimed in claim 1 in which the spring device comprises a stack of plate springs.

References Cited in the file of this patent

UNITED STATES PATENTS

| | | |
|---|---|---|
| 2,563,976 | Torosian | Aug. 14, 1951 |
| 2,571,265 | Leufuen | Oct. 16, 1951 |
| 2,812,684 | Schrem | Nov. 12, 1957 |